US007761609B1

(12) United States Patent
Srinivasan et al.

(10) Patent No.: US 7,761,609 B1
(45) Date of Patent: Jul. 20, 2010

(54) SOCKET LEVEL PACKET SCHEDULING FOR CONNECTIONLESS PROTOCOLS

(75) Inventors: Thirumalai Srinivasan, San Jose, CA (US); Sunay Tripathi, San Jose, CA (US); Cahya A. Masputra, Millbrae, CA (US); Hsiao-Keng J. Chu, Palo Alto, CA (US)

(73) Assignee: Oracle America, Inc., Redwood City, CA (US)

( * ) Notice: Subject to any disclaimer, the term of this patent is extended or adjusted under 35 U.S.C. 154(b) by 1185 days.

(21) Appl. No.: 11/038,984

(22) Filed: Jan. 20, 2005

(51) Int. Cl.
*G06F 15/16* (2006.01)

(52) U.S. Cl. .................................................. 709/250

(58) Field of Classification Search .............. 370/230.1, 370/231, 235, 236, 469, 493; 709/232, 233, 709/234, 250
See application file for complete search history.

(56) References Cited

U.S. PATENT DOCUMENTS

| 5,583,995 | A  | * | 12/1996 | Gardner et al. ............... 709/219 |
| 6,055,577 | A  | * | 4/2000  | Lee et al. ..................... 709/233 |
| 6,173,325 | B1 | * | 1/2001  | Kukreja ....................... 709/224 |
| 6,247,061 | B1 | * | 6/2001  | Douceur et al. ............... 709/240 |
| 6,487,562 | B1 | * | 11/2002 | Mason et al. ................. 707/205 |
| 6,570,883 | B1 | * | 5/2003  | Wong .......................... 370/412 |
| 6,643,260 | B1 | * | 11/2003 | Kloth et al. .................. 370/235 |
| 6,647,419 | B1 | * | 11/2003 | Mogul ......................... 709/226 |
| 6,675,229 | B1 | * | 1/2004  | Bruno et al. .................. 719/328 |
| H002103   | H  | * | 5/2004  | Modiano ...................... 370/230 |
| 6,757,367 | B1 |   | 6/2004  | Nicol |
| 6,807,667 | B1 | * | 10/2004 | Bar et al. ..................... 719/320 |
| 6,820,117 | B1 | * | 11/2004 | Johnson ....................... 709/223 |
| 6,862,624 | B2 | * | 3/2005  | Colby et al. .................. 709/226 |
| 6,876,668 | B1 | * | 4/2005  | Chawla et al. ................ 370/468 |
| 6,879,561 | B1 | * | 4/2005  | Zhang et al. ................. 370/235 |
| 6,976,258 | B1 | * | 12/2005 | Goyal et al. ................. 718/104 |
| 6,988,144 | B1 | * | 1/2006  | Luken et al. ................. 709/231 |
| 6,990,113 | B1 | * | 1/2006  | Wang et al. .................. 370/412 |
| 7,047,366 | B1 | * | 5/2006  | Ezra ........................... 711/141 |
| 7,212,785 | B2 | * | 5/2007  | Brassil et al. ............... 455/41.2 |
| 7,415,529 | B2 | * | 8/2008  | Saunders et al. ............ 709/231 |
| 2001/0026535 | A1 | * | 10/2001 | Amou et al. ................. 370/235 |
| 2001/0030970 | A1 | * | 10/2001 | Wiryaman et al. .......... 370/401 |

(Continued)

OTHER PUBLICATIONS

Anderson et al., "Failure-Atomic File Access in an Interposed Network Storage System," 2000 IEEE, 2000, (pp. 157-164).

(Continued)

*Primary Examiner*—John Follansbee
*Assistant Examiner*—Imad Hussain
(74) *Attorney, Agent, or Firm*—Robert C. Kowert; Meyertons, Hood, Kivlin, Kowert & Goetzel, P.C.

(57) ABSTRACT

A system for socket-level packet scheduling over connectionless network protocols includes a processor and a memory coupled to the processor. The memory contains program instructions executable by the processor to implement an operating system including a packet scheduler for scheduling data transmissions via a connectionless network protocol. In response to a request from an application specifying one or more desired performance metrics for a data transfer via the connectionless network protocol, the packet scheduler is configured to schedule the data transfer in accordance with the one or more desired performance metrics.

16 Claims, 8 Drawing Sheets

U.S. PATENT DOCUMENTS

| | | | |
|---|---|---|---|
| 2002/0031086 A1* | 3/2002 | Welin | 370/229 |
| 2002/0059365 A1* | 5/2002 | King et al. | 709/203 |
| 2002/0099854 A1* | 7/2002 | Jorgensen | 709/249 |
| 2002/0126690 A1* | 9/2002 | Narayana et al. | 370/444 |
| 2003/0026279 A1* | 2/2003 | Onoda et al. | 370/428 |
| 2003/0165160 A1* | 9/2003 | Minami et al. | 370/466 |
| 2004/0153564 A1* | 8/2004 | Lakkakorpi | 709/232 |
| 2004/0246895 A1* | 12/2004 | Feyerabend | 370/229 |
| 2004/0267952 A1* | 12/2004 | He et al. | 709/231 |
| 2005/0071876 A1* | 3/2005 | van Beek | 725/62 |
| 2005/0163140 A1* | 7/2005 | Dally et al. | 370/412 |
| 2005/0195742 A1* | 9/2005 | Klipper et al. | 370/235 |
| 2006/0095943 A1* | 5/2006 | Demircin et al. | 725/81 |
| 2006/0136928 A1* | 6/2006 | Crawford et al. | 718/105 |

OTHER PUBLICATIONS

Gifford et al., "The Cedar File System," Communications of the ACM, vol. 31, No. 3, Mar. 1988, (pp. 288-298).

"sendfile.man.txt," Extended Library Functions, Nov. 19, 2003, (5 pages).

"sendfileev.man.txt," Extended Library Functions, Apr. 25, 2001, (5 pages).

* cited by examiner setPerf(endPoint ep, perfDescriptor pd, flags fg)

setSocketOption(socket s, level l, optionName on, optionValuePointer ovp, optionValueLength ovl, flags fg)

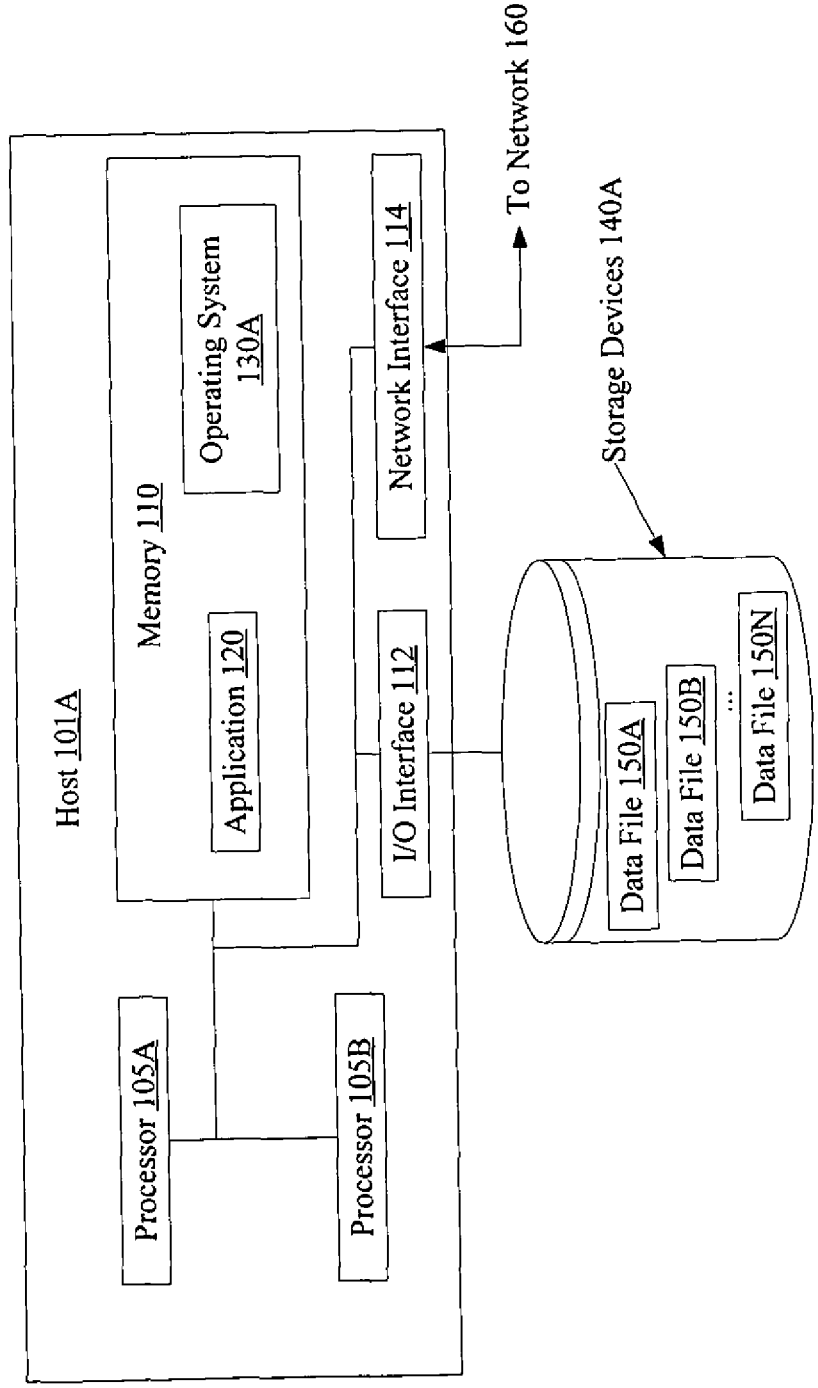

SOCKET LEVEL PACKET SCHEDULING FOR CONNECTIONLESS PROTOCOLS

BACKGROUND OF THE INVENTION

1. Field of the Invention

This invention relates to computer systems and, more particularly, to data transmission over computer networks.

2. Description of the Related Art

Many business organizations provide services that require transmission of large volumes of data to customers over communication networks such as intranets or the Internet. For example, multimedia providers may need to transmit audio and video files on demand from centralized or distributed servers to hundreds or thousands of clients. As the usage of broadband connections to the Internet increases, the demand for consumer multimedia applications such as video and audio subscription services is expected to continue growing rapidly. Within corporate intranets, where high bandwidth interconnects such as dedicated T1 lines may often be deployed, other multimedia applications such as video conferencing, long distance education (e.g., using taped versions of courses), broadcasts of company events to worldwide locations, and the like are quickly becoming more popular. In each of these kinds of applications, large amounts of data (e.g., from tens of megabytes to several gigabytes), which may typically be stored within a single file or a set of files, may need to be transmitted to a large number of clients.

Frequently, file transmission is performed using one or more protocols of the TCP/IP (Transmission Control Protocol/Internet Protocol) family of network protocols. For reliable transmissions, a connection-oriented protocol such as TCP may be employed. However, TCP and other reliable protocols may not be best suited for transmission of data for some kinds of applications where some level of packet loss may be tolerated. Reliable connection-oriented protocols like TCP automatically perform flow control and congestion control, for example by shrinking window sizes in response to a detection of congestion or packet loss. Thus, for example, if a few packets of a video file are lost during a transmission over a reliable connection-oriented protocol, the networking software implementing the protocol at the server may throttle the flow of subsequent packets, and may even stop transmitting data packets under certain conditions. Such automatic throttling of data transfer may result in unacceptable delays and interruptions at the client. Instead of demanding guaranteed in-sequence transmission for each and every packet of an audio or video file, in many cases audio and video client playback applications may accept a certain rate of packet loss, as long as new packets keep arriving, allowing playback to continue even if a few frames of a video or a few notes of an audio recording are lost.

As a result of the potentially undesirable consequences of transmitting audio or video data over connection-oriented protocols like TCP described above, many multimedia applications may be configured to use connectionless and potentially unreliable protocols like UDP (User Datagram Protocol) instead. A connectionless protocol may provide unreliable delivery of data packets using a protocol like IP to transport messages between machines. Packets sent over a connectionless protocol may be lost, duplicated, delayed, or delivered out of order. A server expects no explicit acknowledgments at the protocol level when it transmits data over a connectionless protocol. Consequently, networking software at the server may often be configured to ignore packet loss, network congestion and other similar problems. Instead of throttling data transmission of a video or audio file in the presence of errors, a server using a connectionless protocol may simply continue with transmissions of subsequent packets, which may often be the desired behavior from the point of view of video or audio playback applications at the clients.

Traditionally, however, the use of connectionless networks such as UDP for file transmission has been hampered by a number of factors. A single server application may be responsible for serving files to numerous clients, and may have to manage the scheduling of packets for each client separately at the server application level. In many applications, different clients may have different performance requirements, further complicating the scheduling tasks that may need to be performed at the server application. Packet scheduling may have to be implemented by the application using operating system provided timers or other mechanisms that may require one or more system call invocations for the scheduling of each packet. Interrupts and context switches generated due by timer expirations or timeouts related to application-level scheduling may further reduce the scalability of the application. In addition, the server application transmitting the multimedia file may typically have to subdivide the file into small segments, initialize a packet header including the client's address for each segment, and send each segment using a separate invocation of another system call. Further, each segment of the file to be transmitted may have to copied twice at the server: first, the segment may be copied from a storage device such as a disk into a buffer in the application's address space, and then, the segment may be copied from the buffer into an operating system kernel address space for transmission over the connectionless protocol. As the number of clients concurrently handled by a given multimedia server or other file provider increases, the complexity for the server application of simultaneously managing multiple transmissions, and the processing costs incurred by the application (e.g., for packet scheduling, generating packet headers, transmitting each packet individually, and multiple copies for each segment of data) may both increase to prohibitive levels.

SUMMARY

Various embodiments of a system and method for socket-level packet scheduling over connectionless network protocols are disclosed. According to one embodiment, a system includes a processor and a memory coupled to the processor. The memory contains program instructions executable by the processor to implement an operating system including a packet scheduler for scheduling data transmissions via a connectionless network protocol. In response to a request from an application specifying one or more desired performance metrics for a data transfer via the connectionless network protocol, the packet scheduler is configured to schedule the data transfer in accordance with the one or more desired performance metrics. For example, if the desired performance metrics include a preferred transfer rate, the packet scheduler may attempt to schedule transmission of packets at a rate corresponding to the preferred transfer rate during the data transfer. Various types of performance metrics may be specified by the application in different embodiments, such as preferred transfer rates, desired packet sizes, maximum tolerable jitter, etc. The packet scheduler may schedule data transfers in accordance with a configurable scheduling policy in some embodiments.

In one embodiment, upon receiving the request from the application, the operating system is configured to predict whether the one or more desired performance metrics can be supported, and to send a response indicating a prediction result to the application. The operating system may be configured to take a number of different factors into account in making the prediction in different embodiments, such as network bandwidth limits, current resource utilization levels, resource utilization level trends, etc. If, for example, the operating system predicts that the desired performance metrics can be supported, the application may initiate the data transfer. The operating system may provide a system call interface in one embodiment for specifying the one or more desired performance metrics, and the application may be configured to invoke the system call interface to specify the metrics.

The operating system may also include a second system call interface to send one or more data files via the connectionless network protocol to another system in one embodiment, and the application may be configured to invoke the second system call interface to initiate the data transfer. In response to the invocation of the second system call, the operating system may be configured to send one or more data files to the other system, without the application copying contents of the one or more data files to application address space. Thus, in such an embodiment, the application may transfer responsibility for managing details of file transmission for one or more files over the connectionless network protocol to the operating system with a single invocation of the system call interface. The operating system, rather than the application, may generate the headers of the datagrams used to transmit the contents of the data files. Also, the operating system, rather than the application, may read the data files and copy the contents of the data files to the datagram bodies; the application may not need to allocate any memory buffers in application address space to store contents of the data files. The application, having invoked the system call interface, may be free to perform other application-level tasks while the contents of the data files are transferred over the network.

In an embodiment where the packet scheduler schedules packets according to a configurable scheduling policy, the operating system may include a third system call interface for specifying the configurable scheduling policy. Any desired connectionless networking protocol, such as the User Datagram Protocol (UDP) may be used for the data transmissions.

BRIEF DESCRIPTION OF THE DRAWINGS

FIG. 8 illustrates an example of a function name and parameters that may be used to invoke a system call interface to specify a configurable packet scheduling policy, according to one embodiment.

FIG. 9 is a block diagram illustrating constituent elements of a host, according to one embodiment.

Figure 1:
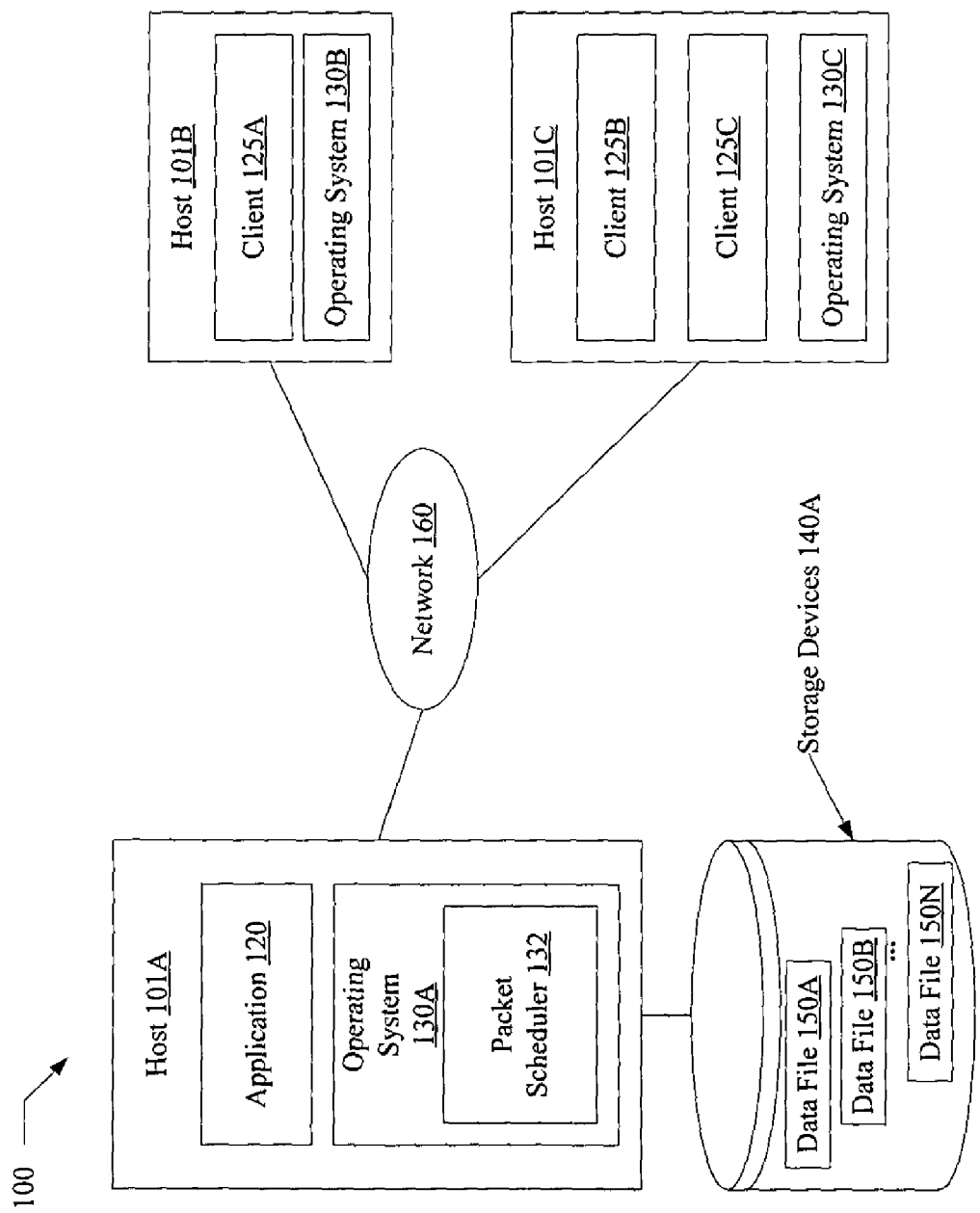
FIG. 1 is a block diagram illustrating one embodiment of a system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENTS

FIG. 1 is a block diagram illustrating one embodiment of a system 100. The system includes hosts 101A, 101B and 101C (which may be collectively referred to herein as hosts 101) coupled by a network 160. Each host 101 includes a respective operating system 130: e.g., operating system 130A at host 101A, operating system 130B at host 101B, etc. One or more data files 150A, 150B, ... 150N (collectively, data files 150) may be stored in one or more storage devices 140A accessible from host 101A. Operating system 130A at host 101A includes a packet scheduler 132 configured to schedule data transmissions via a connectionless network protocol. In response to a request from an application 120 specifying one or more desired performance metrics for a data transfer via the connectionless network protocol, the packet scheduler 132 is configured to schedule the data transfer in accordance with the one or more desired performance metrics. For example, the data transfer may include a transmission of a sequence of packets that collectively contain the contents of one or more data files 150, and the packet scheduler 132 may transmit successive data packets of the sequence via the connectionless network protocol at a rate corresponding to one of the desired performance metrics specified. Further details of interfaces that may be used by application 120 to communicate with operating system 130A, e.g., to specify the desired performance metrics and to initiate the data transfer, are provided below.

Application 120 may be any type of application configured to transmit data over a network. In some embodiments, application 120 may be a server providing some type of service to one or more clients 125 (i.e., one or more of clients 125A, 125B or 125C), while in other embodiments, application 120 may transmit data to a peer application at another host, i.e., in a peer-to-peer configuration. In one embodiment, for example, application 120 may be a multimedia server configured to provide clients 125 with audio and/or video files, or a server configured to provide Voice Over IP (VOIP) services such as long-distance or local telephone services. Multiple applications 120 may be executed at the same host 101 in some embodiments. A client 125 may be any application configured to receive data from another application 120, such as an audio or video playback application, or a VOIP subscriber application. Multiple clients may be incorporated within a single host 101 in one embodiment, and one or more clients 125 may be co-resident at the same host 101A as application 120 in other embodiments. In some embodiments, data may be transmitted in both directions over network 160 via the connectionless networking protocol: that is, application 120 may be configured to send data to a client 125, and a client 125 may be configured to send data (as well as data transfer requests) to application 120. In one embodiment, more than one protocol may be in use for communication between application 120 and a client 125: for example, a reliable connection-oriented network protocol may be used to establish a control channel of communication between application 120 and a client 125 (e.g., for secure client-server authentication, and for a client 125 to send data transfer requests to application 120), while a connectionless network protocol may be used to transfer file data.

Operating systems 130 may each be any desired operating system, and may differ from one another in some embodiments. For example, in one embodiment, operating system 130A may be a version of the Solaris™ operating system from Sun Microsystems, while operating system 130B may be a version of a Windows™ operating system provided by Microsoft Corporation, and operating system 130C may be a version of Linux. Any general-purpose operating system or special purpose operating system (such as a real-time operating system), operable to support a connectionless network protocol, may be used at a host 101.

Network 160 may be implemented using any of a number of different hardware and software technologies in different embodiments. For example, in one embodiment, network 160 may be a Local Area Network (LAN), which may be implemented using any desired copper-based networking links such as various versions of Ethernet and/or optical fiber-based networking hardware. In other embodiments, network 160 may be a Metropolitan Area Network (MAN), a Wide Area Network (WAN), or may include links of a distributed network such as the Internet. As described below, a given data file 150 may be transmitted by operating system 130A using one or more datagrams in some embodiments, and successive datagrams may be routed over physically distinct paths of network 160; that is, not all datagrams corresponding to a particular data file 150 may utilize the same set of physical networking links. In some embodiments, network 160 may include one or more wireless links.

Any desired connectionless networking protocol may be utilized for data transmission over network 160. Packets sent via a connectionless networking protocol may be referred to as "datagrams". A datagram sent using a connectionless networking protocol may be lost, duplicated, delayed, or delivered out of order with respect to other datagrams. The connectionless networking protocol may make a "best effort" to deliver all the datagrams, but may provide no guarantee that any given datagram will be delivered. No acknowledgment is required to be sent by the recipient of a datagram to the sender. Datagrams may arrive faster than the recipient can process them, and thus may be dropped at the recipient under certain conditions. A connectionless networking protocol may not detect the occurrence of such events, and/or may not inform the sender or receiver of such events. Within the connectionless networking protocol, each datagram may be treated independently from all other datagrams, and each datagram may, for example, contain a header identifying a destination address. While unreliable data transmission is possible using connectionless networking protocols, in practice only a very small fraction of datagrams sent via a connectionless networking protocol may be lost, duplicated, delayed, or delivered out of order. The level of unreliability of a connectionless data protocol may increase as resources (such as the bandwidth of one or more underlying network links) become exhausted or if network failures occur. Applications such as application 120 that utilize connectionless networking protocols may be configured to handle the problem of unreliable data transmission, for example by implementing higher-level protocols that may detect the occurrence of datagram transmission delay or datagram loss, and respond to such occurrences in application-specific ways (e.g., by compensating for or ignoring the unreliable data transmission).

In one embodiment, the connectionless networking protocol utilized by operating system 130A may be the User Datagram Protocol (UDP). UDP provides connectionless datagram delivery using the Internet Protocol (IP) to transport messages between machines. UDP and IP each belong to the Transmission Control Protocol/Internet Protocol (TCP/IP) protocol suite commonly used for communication over the Internet. Like other connectionless protocols, UDP does not use acknowledgments to make sure datagrams arrive, it does not order incoming datagrams, and it does not provide feedback to control the rate at which data flows between a sender (such as application 120) and a receiver (such as a client 125).

Figure 2:
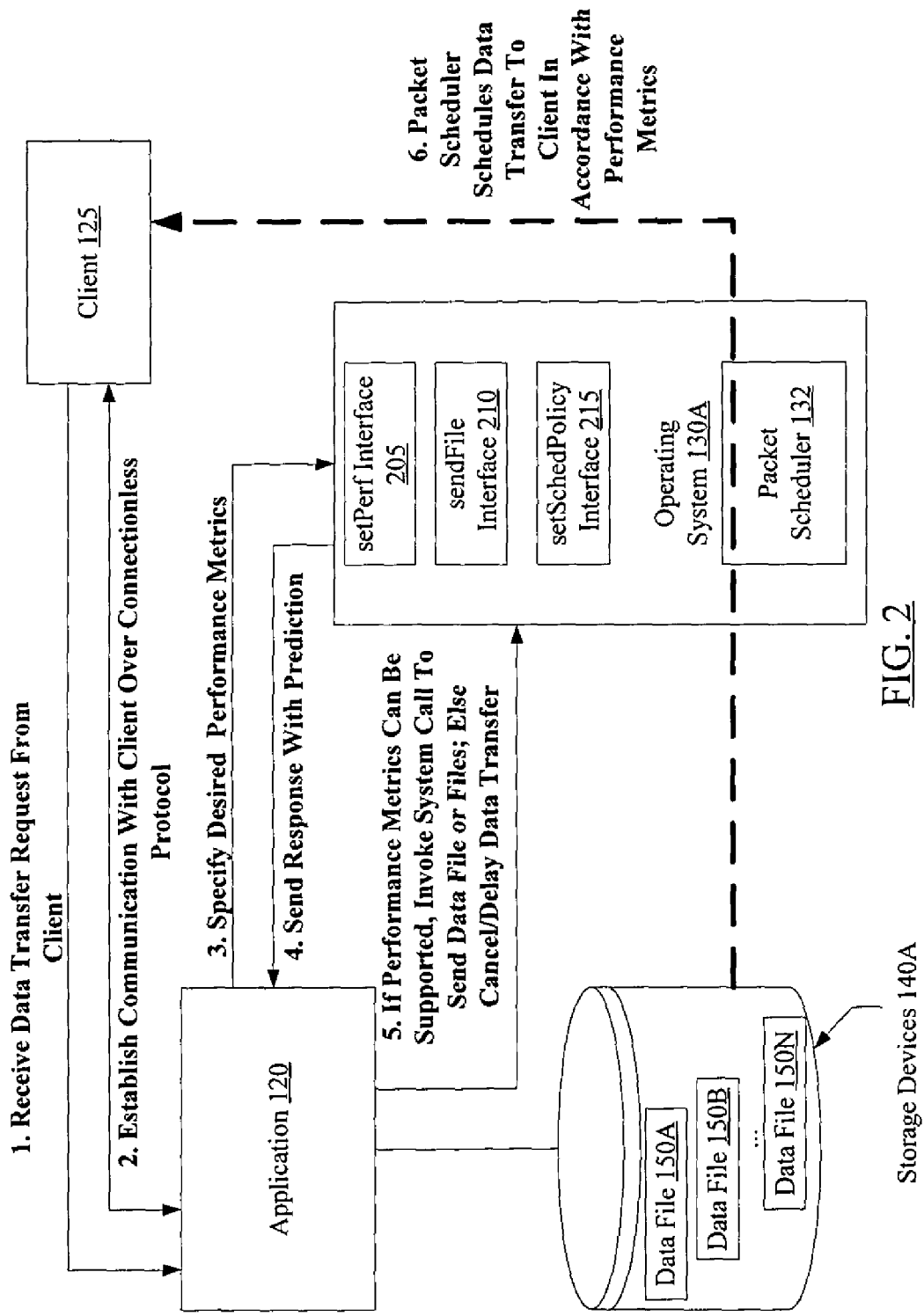
FIG. 2 is a block diagram illustrating aspects of the operation of an application and an operating system according to one embodiment.

FIG. 2 is a block diagram illustrating aspects of the operation of application 120 and operating system 130A, according to one embodiment. In addition to packet scheduler 132, operating system 130A may include one or more system call interfaces related to data transmission over a connectionless network protocol, such as setPerf 205, sendFile 210, and setSchedPolicy 215. The setPerf system call interface may be used to specify desired performance metrics for a data transfer over a connectionless network protocol; the sendFile system call interface to atomically transfer contents of one or more data files 150 over the connectionless network protocol; and the setSchedPolicy system call may be used to modify a configurable scheduling policy of the packet scheduler 132. Each of these system calls is described in further detail below. It is noted that the names associated with the system call interfaces in FIG. 2 are merely illustrative examples; in different embodiments, any desired names may be used for the system call interfaces providing the functionality described herein for the setPerf, sendFile and setSchedPolicy system call interfaces. Not all the system call interfaces shown in FIG. 2 may be supported by operating system 130A in some embodiments.

Application 120 may be configured to receive a data transfer request from client 125, as indicated by the arrow labeled "1" in FIG. 2. The client request may be transmitted over a reliable, connection-oriented network protocol such as TCP/IP in some embodiments, and over a connectionless network protocol such as UDP in other embodiments. In some implementations, for example, client 125 may be required to log in or otherwise authenticate itself to application 120 using a secure connection, and the connection used for the authentication may also be used for the transmission of the client request. The client request may include an identification of one or more data files 150, or may specify an alias or logical name for one or more data files 150 that are being requested. For example, in an embodiment where application 120 is a video server, the client 125 may specify the name of a motion picture, and application 120 may map or translate the name of the requested motion picture into the names of one or more data files 150. In some embodiments, the client's request may not be limited to one or more data files 150; e.g., the client may also request status information, billing information, and the like, in addition to requesting one or more data files. The request may also include desired performance requirements from the perspective of the client 125 in some embodiments.

After receiving the client request and performing any application-specific validation or authentication steps required, in one embodiment application 120 may be configured to cooperate with client 125 to establish communication over a connectionless network protocol, as indicated by the bidirectional arrow labeled "2". Application 120 (and client 125) may be configured to invoke one or more system call interfaces other than system call interfaces depicted in FIG. 2, such as a socket system call interface and/or a connect system call interface, in order to establish the communication in some embodiments. During the establishment of communication between application 120 and client 125, a communication endpoint such as a socket may be established at each end.

When the communication has been established, application 120 may be configured to send a request to operating system 130A specifying one or more desired performance metrics for a data transfer via the connectionless network protocol, e.g., a data transfer intended to satisfy at least part of the data transfer request sent earlier by the client 125. The arrow labeled "3" in FIG. 2 illustrates this interaction. As noted above, a client 125 may be configured to specify desired client-side performance requirements in its data transfer request sent to application 120 in some embodiments. Client-specified performance requirements may be based on various factors such as networking bandwidth available to the client 125, buffering capabilities at the client 125, etc. The client 125 may specify one or more performance requirements at a relatively high level such as a total data transmission time in one embodiment, and at a more detailed level such as a preferred transfer rate, a maximum tolerable jitter, and/or a desired packet or datagram size in another embodiment. The application 120 may be configured to derive the one or more performance metrics based on the client-side performance requirements (e.g., the application 120 may derive a desired transfer rate from a data file size known to the application 120 and a total data transmission time requested by the client) in some embodiments. In other embodiments, application 120 may use one or more of the client-side performance requirements without modification as one or more performance metrics to be specified to operating system 130A. In some embodiments, one or more data files 150 that may be transferred in response to the client's request may include an encoding or indicator of an appropriate data transfer rate or other transmission performance requirement, and application 120 may be configured to utilize the indicator in determining the desired performance metrics.

In one embodiment, the desired performance metrics may be derived or obtained by application 120 based on other factors not supplied by the client, such as a client subscription or membership level (e.g., application 120 may attempt to send "Platinum" clients requested files at a faster rate than "Gold" clients), known infrastructure characteristics related to the client (e.g., a knowledge of the client's network bandwidth), environmental factors such as the time of day (e.g., video transmissions during "prime time" may be slower than during "off-peak" hours), or simply how much the client may be charged for a given data transfer. A combination of client-specified performance requirements and one or more other factors such as those described here may be used to determine the performance metrics in some embodiments. Application 120 may invoke the setPerf system call interface 205 to specify the desired performance metrics to operating system 130A in one embodiment. Further details related to the parameters that may be specified by application 120 in invoking the setPerf system call interface 205 are provided below in conjunction with the description of FIG. 4a.

Under some conditions, for example as the number of clients 125 being served concurrently by application 120 increases, contention for resources such as network 160, storage devices 140A, and/or processors at host 101A may make it hard or impossible to meet the desired performance level for additional data transfers. In one embodiment, upon receiving a request from application 120 specifying one or more desired performance metrics for a data transfer, operating system 130A may be configured to predict whether the desired performance metrics can be supported, and to send a response including a result of the prediction to application 120, as indicated in the arrow labeled "4" in FIG. 2. The response may be encoded in the form of a return code for a function called by application 120 to invoke the setPerf system call in one embodiment. In another embodiment, an asynchronous notification mechanism, such as an operating system signal, may be used for the response.

Operating system 130A may make the prediction based on a number of factors in different embodiments, such as network bandwidth limitations, current resource utilization levels, trends in resource utilizations, heuristics based on previous experience, results of tests such as round-trip message response times for transfers between hosts, and/or limits set by a system administrator. In some embodiments, packet scheduler 132 may be configured to collect and/or save performance data on in-progress data transfers (for example, indicating whether previous predictions for data transfer performance metrics were accurate), which may be used by operating system 130A to help make the prediction. It is noted that in various embodiments, operating system 130A may not be configured to guarantee that the desired performance metrics or requirements will be met; rather, operating system 130A may simply be configured to estimate the likelihood that the desired performance level would be provided during a desired data transfer, and make a prediction based on such an estimate. The prediction may be expressed in a number of different ways in different embodiments. For example, in one embodiment, the operating system 130A may simply provide one of two integers as a result of the predictions: e.g., if the result is a "0", the prediction is that the application's desired performance metrics can be supported, and if the result is "1", the prediction is that the desired performance metrics cannot be supported. Other, more symbolic and/or more nuanced representations (e.g., a prediction result indicating an estimated probability of the desired performance metrics being supported) of the prediction may be provided by operating system 130A in its response to application 120 in some embodiments.

If the response sent to application 120 by operating system 130A indicates that the desired performance metrics can be supported, application 120 may be configured to initiate the data transfer. In an embodiment where operating system 130A includes a system call interface such as the sendfile system call interface 210 for sending one or more data files 150 over the connectionless network protocol, application 120 may be configured to invoke the system call interface, as indicated in the arrow labeled "5" in FIG. 2. Prior to invoking the system call, application 120 may be configured to perform one or more additional steps in some embodiments, such as opening the data files 150 to be transferred (e.g., using an open system call interface) and/or validating that the contents of the data files 150 have not been inadvertently corrupted. In some embodiments, the data files may be opened and/or validated by application 120 prior to, or in parallel with, establishing the communication with client 125 (i.e., prior to or in parallel with the operations illustrated by the bidirectional arrow labeled "2" in FIG. 2). Further details related to the parameters that may be specified by application 120 in invoking the sendFile system call interface 210 are provided below in conjunction with the description of FIGS. 5a and 5b.

If the response sent to application 120 by operating system 130A in the interaction illustrated by arrow labeled "4" in FIG. 2 indicates that the desired performance metrics cannot be supported, application 120 may be configured to cancel or delay the data transfer in some embodiments, or to repeatedly retry the data transfer at specific intervals in other embodiments. In one embodiment, application 120 may also be configured to send a message to the client 125 indicating that the requested data transfer may not be feasible at the current time. In one implementation, when operating system 130A sends a response to application 120 indicating that the desired performance metrics cannot be supported, the response may also include a recommended waiting period before the application should send another request or retry the same request.

After application 120 initiates the data transfer, the operating system 130A may be configured to complete the desired transmission on behalf of application 120. In response to an invocation of the sendFile system call interface 210, for example, operating system 130A may be configured to send the one or more data files 150 to client 125 without application 120 copying contents of the data files into application address space. That is, application 120 may simply invoke the sendFile system call interface 210 with a pointer to the data, such as a file descriptor returned from a previous invocation of an open system call interface, and does not need to read the file or copy the file contents into application address space for the purpose of sending the file contents to client 125. Part or all of the contents of the data files 150 may be copied into application address space for other purposes; however, such a copy is not required for the invocation of system call 210. In some embodiments, as described in further detail below, the entire contents of one data file 150 or multiple data files 150 may be sent to client 125 with a single invocation of the sendFile system call interface, i.e., atomically from the perspective of application 120. The system call interface may also allow application 120 to send specified portions of one or more data files 150, instead of the entire contents of the data files. Within the operating system, each data file 150 or portion of a data file 150 may be sent using one or more datagrams, and packet scheduler 132 may be configured to schedule the transmission of the datagrams in accordance with the desired performance metrics, as indicated by the broken arrow labeled "6" in FIG. 2. Thus, instead of application 120 being responsible for partitioning a given data file 150 into datagrams, and scheduling the individual datagrams, operating system 130A may be configured to partition the data file and schedule datagram transmissions. In one embodiment, packet scheduler 132 may schedule data transmissions according to a configurable scheduling policy. The scheduling policy may be specified using a system call interface such as setSchedPolicy 215 in some embodiments, as described in further detail below in conjunction with the descriptions of FIG. 7 and FIG. 8.

Operating system 130A may be configured to read the data files 150 from storage devices 140A in order to send the data files to client 125 in some embodiments. In other embodiments, operating system 130A may also be configured to store a copy of one or more data files 150 within a kernel cache (not shown in FIG. 2), which may be implemented in volatile and/or persistent storage. If application 120 invokes system call interface 210 to send a data file 150 that is already resident in the kernel cache, operating system 130A may be configured to send the data file 150 to the client 125 from the kernel cache, instead of reading the data file from storage devices 140A.

It is noted that in some embodiments, upon receiving a request from application 120 specifying one or more desired performance metrics for a data transfer, operating system 130A may be configured not to send an immediate response to application 130A. Instead, in one embodiment, operating system 130A may be configured to use its knowledge of the desired performance metrics in determining a response to a subsequent request for a data transfer from application 120. For example, in one implementation, application 120 may invoke a system call interface such as setPerf 205 to specify desired performance metrics for a data transfer. Then, for example without receiving an indication or response from the application 130A as to whether the desired performance metrics can be supported, application 120 may invoke a system call interface such as sendFile 210 to initiate a transfer of one or more data files 150. In response to the invocation of the sendFile system call interface 210, operating system 130A may predict whether the desired performance metrics can be supported during a data transfer of the one or more data files 150. If the desired performance metrics can be supported, operating system 130A may send the one or more data files over the connectionless network protocol, and send a response such as a function return value to application 120 indicating that the data transfer request has been initiated successfully, indicating that the desired performance metrics can be supported during the data transfer. If the desired performance metrics cannot be supported, operating system 130A may send a response to application 120 indicating that the desired performance metrics cannot be supported, and may not transfer the data files 150. Thus, in such an embodiment, operating system 130A may be configured to provide a response indicating whether the desired performance metrics can be supported to the request for the data transfer (e.g., to an invocation of the sendFile system call interface 210) rather than to the request specifying the one or more desired performance metrics (e.g., to an invocation of the setPerf system call interface 205).

In another embodiment, operating system 130 may provide a single interface to specify desired performance metrics and also to send one or more data files 150 over the connectionless network protocol. For example, in one implementation, operating system 130A may provide a function to invoke the sendFile system call interface 210 that includes parameters specifying the desired performance metrics.

Figure 3:
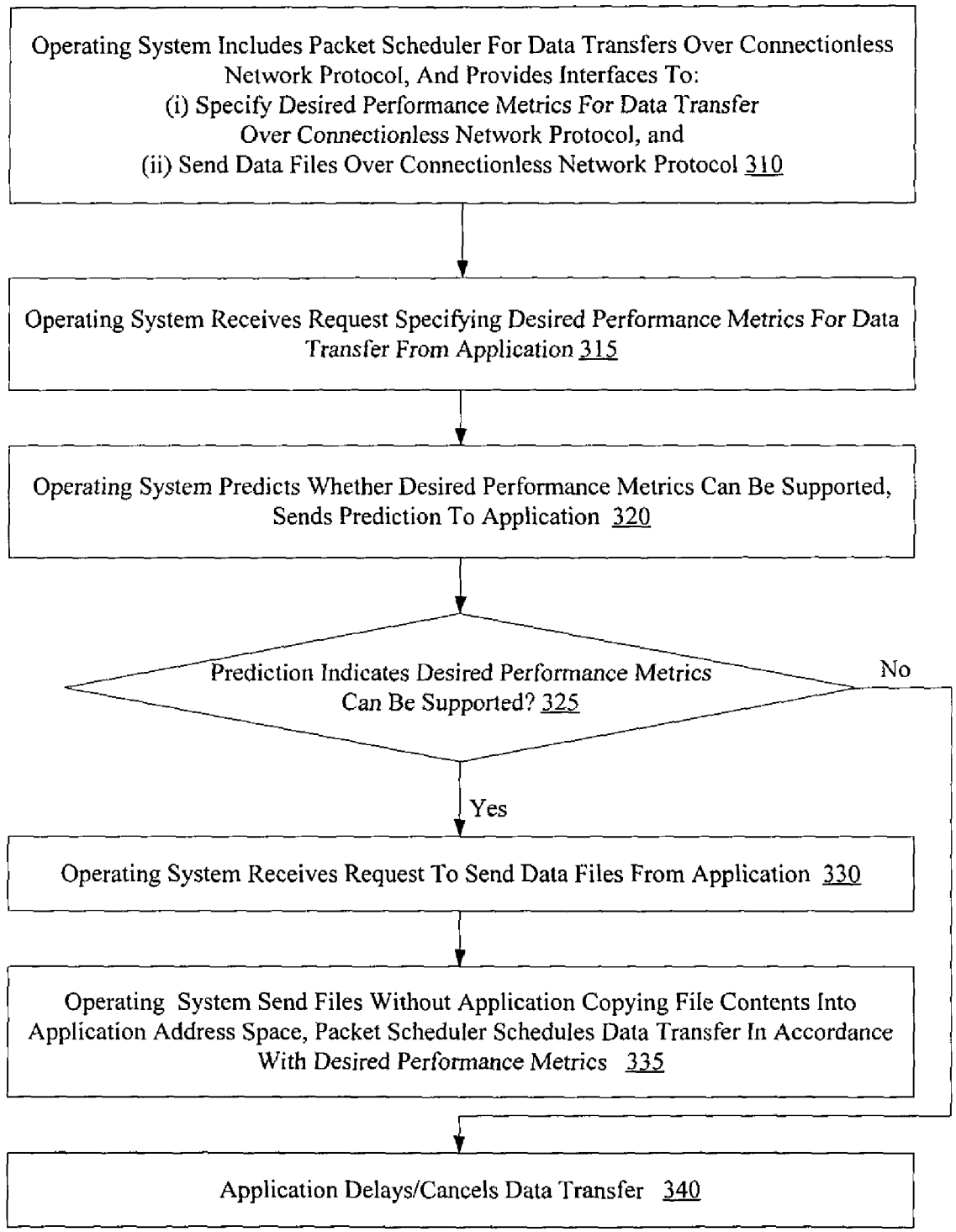
FIG. 3 is a flow diagram illustrating aspects of the operation of an operating system according to one embodiment.

FIG. 3 is a flow diagram illustrating aspects of the operation of operating system 130A according to one embodiment. As shown in block 310, operating system 130A may include packet scheduler 132 for scheduling data transmissions over a connectionless networking protocol, and may provide one or more interfaces related to data transfer over the connectionless network protocol. For example, in one embodiment, operating system 130A may provide a first interface (such as the setPerf system call interface 205) for specifying one or more performance metrics for a data transfer over the connectionless network protocol. A second interface for sending one or more data files via the connectionless protocol (such as the sendFile system call interface 210) may also be provided by operating system 130A in some embodiments. In addition, in one embodiment, operating system 130A may also provide an interface (such as the setSchedPolicy system call interface 215) for specifying a configurable scheduling policy for packet scheduler 132. FIG. 4a-4b, FIG. 5a-5b, and FIG. 8 illustrate specific examples of function names and parameters that may be used to invoke the interfaces provided by operating system 130A, according to various embodiments.

It is noted that operating system 130A may provide functionality supported by the interfaces listed in block 310 using fewer or more interfaces in other embodiments than indicated in block 310—e.g., in one embodiment, a single interface may be provided to specify desired performance metrics and to initiate a data transfer if the performance metrics can be supported. It is also noted that in some embodiments, multiple connectionless network protocols may be supported by operating system 130A. In one such embodiment, operating system 130A may provide a separate set of interfaces for each protocol, while in a second such embodiment, a single set of interfaces may be used for multiple protocols, for example by identifying the particular protocol via one or more parameters passed to a function during an invocation of a system call interface. While in some embodiments, each interface identified in block 310 of FIG. 3 is a system call interface, in other embodiments some or of all the interfaces may not be provided as system call interfaces by operating system 130A. For example, desired performance metrics for a data transfer may be specified using a configuration file in one embodiment, and using one or more environment variables in another embodiment, instead of being specified via an invocation of a system call interface.

Upon receiving a request from an application specifying one or more desired performance metrics for a data transfer over the connectionless network, e.g., by an invocation of the setPerf system call interface 205, as shown in block 315 of FIG. 3, operating system 130A may be configured to predict whether the desired performance metrics may be supported (block 320). In addition, in one embodiment, operating system 130A may be configured to send a result of the prediction to application 120, e.g., in a value returned as a result from a function called to invoke setPerf system call interface 205. In another embodiment, as noted earlier, if operating system 130A determines that one or more of the specified performance metrics cannot be supported, operating system 130A may be configured to deny a request for a data transfer from application 120 (e.g., when application 120 invokes the sendFile system call interface to initiate data transfer). Operating system 130A may be configured to deny such a subsequent request instead of; or in addition to, sending a prediction result to application 120 in some embodiments.

In an embodiment where operating system 130A is configured to send a response including a prediction result to application 130A, if the response indicates that the desired performance metrics can be supported (as detected in decision block 325 of FIG. 3), application 120 may be configured to send a request for a transfer of one or more data files 150 to operating system 130A, for example by invoking the sendFile system call interface 210. On receiving such a request (block 330), operating system 130A may be configured to send the one or more data files 150 to client 125, without application 120 having to copy contents of the data files 150 into its application address space (block 335). During the transfer of the data files via the connectionless network protocol, packet scheduler 132 may be configured to schedule the transfer of one or more datagrams in accordance with the desired performance metrics specified earlier by application 120. If the operating system 130A informs the application 120 that the desired performance metrics cannot be supported, application 120 may be configured to delay or cancel the data transfer (block 340) in some embodiments.

Figure 4A:
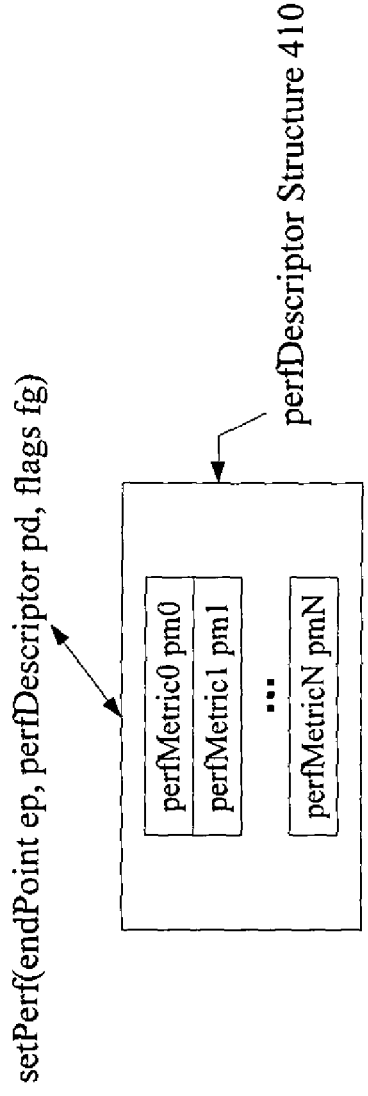
FIG. 4a and FIG. 4b illustrate two specific examples of function names and parameters that may be used to specify one or more desired performance metrics for a data transfer, according to one embodiment.

FIG. 4a illustrates one example of a set of parameters that may be used to specify one or more desired performance metrics using a function named "setPerf( )" to invoke system call interface 205, according to one embodiment. As shown, parameters to setPerf( ) may include endPoint ep, a perfDescriptor pd and flags fg. It is noted that the specific syntax and parameters shown in FIG. 4a-4b, FIG. 5a-5b, and FIG. 8 are examples intended to help describe the type of information that may be passed to various system call interfaces, and may not reflect the actual syntax, function names, parameter names, or parameter types that may be used within an actual operating system such as a version of Solaris™ or Windows™. For example, descriptive names such as "endPoint" are used for parameter types in FIG. 4a, instead of type names such as "int" or "size_t" that may be used in various operating systems. The parameter endPoint ep may identify a communication end point, such as a socket, that may be used to communicate with client 125 via a connectionless network protocol. As noted earlier, application 120 may be configured to set up the endpoint during establishment of communication with client 125, for example by invoking one or more socket system call interfaces.

Parameter perfDescriptor pd may be used to specify one or more desired performance metrics for a data transfer over an endpoint specified by ep. As shown, a perfDescriptor structure 410 may be implemented as a data structure with one or more fields such as perfMetric0 pm0, perfMetric1 pm1, etc., where each perfMetric field specifies a value for a particular performance metric. Any desired performance metrics appropriate for characterizing data transfer may be specified using a perfDescriptor structure 410. For example, in one implementation, perfMetric0 may specify a desired or preferred transfer rate, which may be expressed in a unit such as packets per second, bytes per second, or megabytes per minute; perfMetric1 may specify a desired or preferred packet size (e.g., expressed in bytes or kilobytes); and perfMetric2 may specify a maximum tolerable jitter (e.g., expressed in milliseconds). Jitter is a term used to express a measure of variation in the amount of time taken to deliver successive packets or datagrams. An increase in jitter during a video transmission, for example, may result in distortions during playback at a client 125; in general, low jitter may provide higher quality playbacks or transmissions of audio/video. Each of the performance metrics specified in perfDescriptor structure 410 may be expressed using any appropriate units. In some embodiments, a perfDescriptor data structure 410 may also include fields for descriptive names and/or units for each specified metric. Application 120 may be configured to prepare a perfDescriptor structure 410 for an invocation of setPerf interface 205, e.g., by allocating memory for the structure, deriving various metrics based on client-specified performance requirements as described earlier, and by populating the fields of the structure.

The parameter flags fg may be used to specify one or more additional options related to the invocation of the setPerf system call. In one embodiment, for example, application 120 may specify a relative priority for its request, indicate one or more characteristics of the desired data transfer other than the specified performance metrics (for example, a particular flag value such as LARGE_FILE may be set to indicate that a data file 150 to be transmitted to client 125 has a size greater than a threshold such as a gigabyte), or a preferred method of notification of application 120 of the results of a prediction by operating system 130A. The flags parameter may be implemented using a bitmap in some embodiments. In general, a flags parameter to a function may allow additional features to be implemented over time, without affecting the functionality of existing applications using the function. Operating system 130A may provide a return value to a caller of setPerf( ) such as application 130A. The return value may indicate a prediction result, as described earlier, in some embodiments, and may simply indicate that operating system has successfully parsed and/or validated parameters passed during the call in other embodiments.

In some embodiments, operating system 130A may provide one or more generic functions and/or system call interfaces to specify various characteristics of data transmission over an endpoint such as a socket. For example, many operating systems (such as various versions of Solaris™ from Sun Microsystems) support a system call interface to specify various options for sockets (i.e., communication endpoints created as result of an invocation of a socket system call interface). The same function or system call interface may be used to specify characteristics for socket-level communication over several network protocols, including connection-oriented network protocols as well as connectionless network protocols. Such a function may also be used to specify the desired performance metrics for a data transfer over a connectionless network protocol in some embodiments.

Figure 4B:
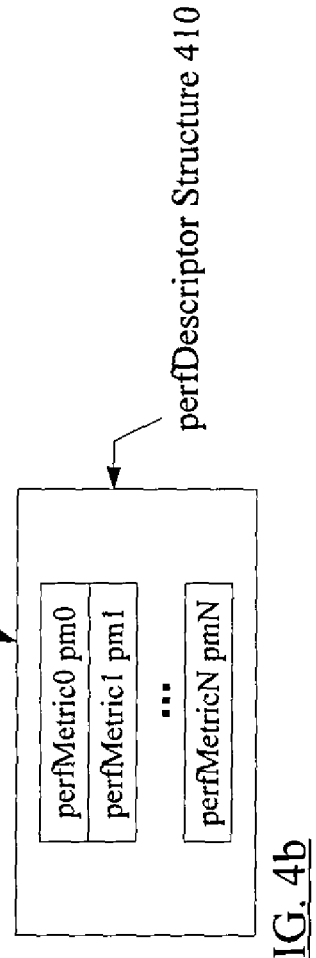

FIG. 4b illustrates one example of a set of parameters that may be used to specify one or more desired socket options, including desired performance metrics, using a system call invoked by calling a setSocketOption( ) function, according to one embodiment. The parameters to the function include socket s, level l, optionName on, optionValuePointer ovp, optionValueLength ovl, and flags fg. The parameter socket s may be used to identify the endpoint for which options are being set (just as endPoint ep may be used in the setPerf( ) function described above). The parameter level l may be used to specify a level (e.g., a specific networking protocol layer) within a networking software stack at operating system 130A at which the specified option is applied and/or utilized. For example, in one implementation, a first value of level l (e.g. "SOL_SOCKET") may be specified for an option that is to be applied or used at the socket layer, a second value of level l may be specified for an option that affects only a particular layer below the socket layer, etc. In some implementations, specific protocol numbers as identified in various networking standards such as the TCP/IP family of protocols may be used for specifying level l.

The particular option or characteristic being set by a call to setSocketOption( ) may be specified by optionName op. For example, the SO_DEBUG option name may be used to specify that debugging information should be recorded during data transmission (e.g., in an operating system buffer), the SO_REUSEADDR option name may be used to enable/disable local address reuse, etc. For specifying desired performance metrics during data transmission over a connectionless network protocol such as UDP, an option name such as SO_SENDRATE, SO_PERFMETRICS or SO_UDPPERF may be used in one implementation. The optionValuePointer ovp parameter may be a pointer to a data structure (such as perfDescriptor structure 410) specifying one or more values for the option identified by optionName. The size of the data structure being pointed to by optionValuePointer ovp may be specified (e.g., in bytes or in any other appropriate unit) using the optionValueLength parameter. The flags parameter may be used for specifying any additional characteristics related to setting socket options, and to support extensibility of the functionality provided by setSocketOption( ).

In order to set socket options for a data transfer of one or more data files 150, for example, application 120 may be configured to prepare a perfDescriptor structure 410 and call setSocketOption( ). In one implementation, for example, where perfMetric0 specifies a desired packet rate in packets per second, perfMetric1 specifies a preferred packet size in bytes, and perfMetric2 specifies a maximum tolerable jitter in milliseconds, application 120 may be configured to call setSocketOption( ) to set an option for desired performance metrics (SO_SENDRATE) at the socket level (SOL_SOCKET) using code logically similar to the following pseudo-code (text following "//" indicates a comment):

perfDescriptor p=new perfDescriptor( ); // allocate new perfDescriptor structure p.perfMetric0=8192; // set desired packet rate to 8192 packets per second p.perfMetric1=4096; // set preferred packet size to 4 kilobytes p.perfMetric1=10; // set maximum tolerable jitter to 10 milliseconds setSocketOption(sfd, SOL_SOCKET, SO_SENDRATE, &p, sizeof(p), null);

// sfd is the socket file descriptor, sizeof(p) returns the size of the perfData // structure p, and flags are set to null As noted earlier, the sendFile system call interface 210 of operating system 130A may be used to send a single data file 150 or multiple data files 150 to a client 125 or to another system via a connectionless network protocol. In the embodiment illustrated in FIG. 5a and FIG. 5b, a first function (such as "sendFile( )") may be used to send part or all of a single data file 150, while a second function with a different name (such as "sendFileArray( )") may be used to send part or all of one or more data files. In other embodiments, only a single function may be provided to send any desired number of files, or more than two functions may be provided. In some embodiments utilizing a single function, it may be possible to send a single data file using a different (and potentially simpler) parameter set than the parameter set used to send multiple data files.

Figures 5A, 5B:
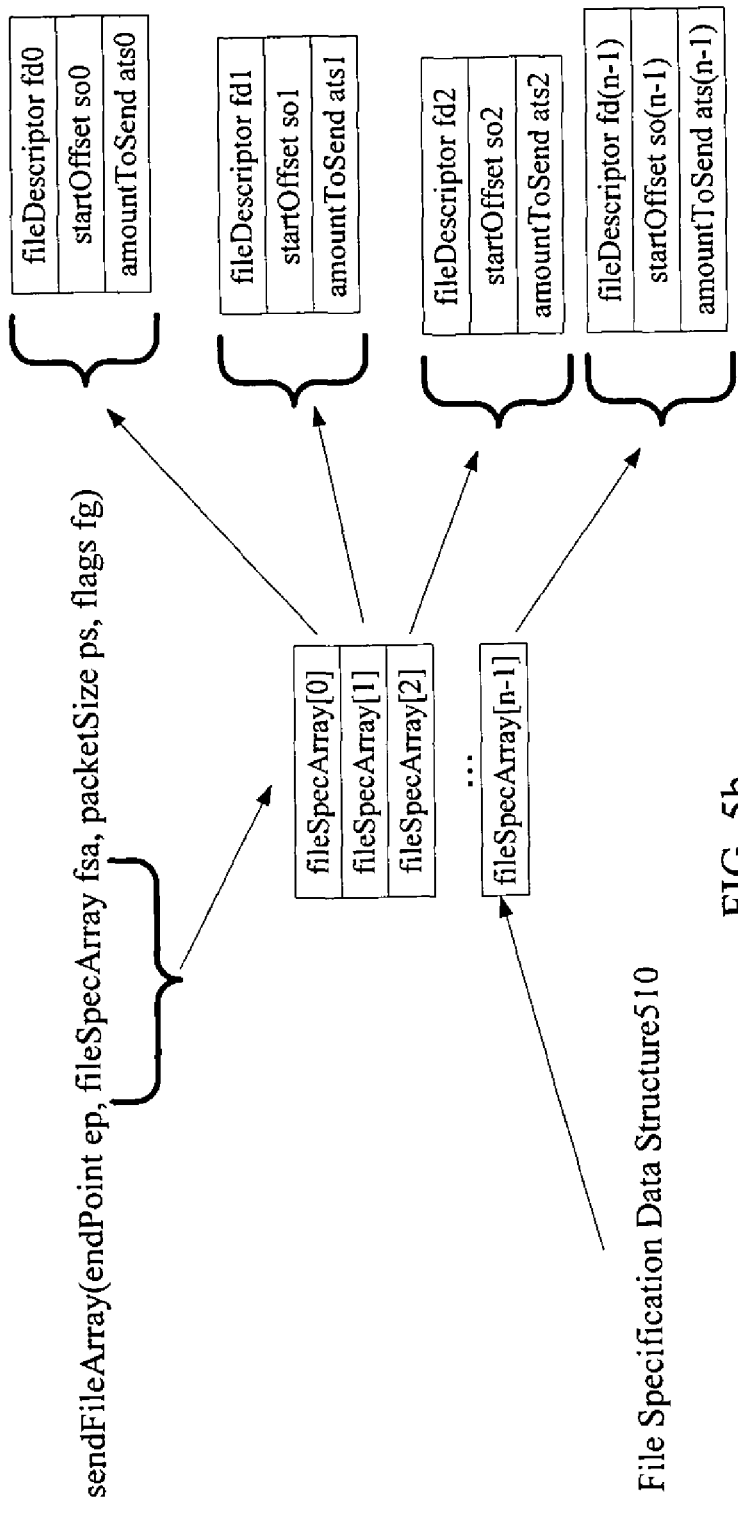
FIG. 5a and FIG. 5b illustrate two specific examples of function names and parameters that may be used to invoke a system call interface to initiate a data transfer, according to one embodiment.

FIG. 5a illustrates one example of a set of parameters that may be used to send a single data file 150 using a function named "sendFile( )" to invoke system call interface 210. In FIG. 5a, the parameters to sendFile( ) include endPoint ep, fileDescriptor fd, startOffset so, amountToSend ats, packetSize ps and flags fg. The parameter endPoint ep may identify a communication end point, such as a socket, that may be used to communicate with client 125 via a connectionless network protocol. In an embodiment where the setPerf( ) or setSocketOption( ) function is called prior to the sendFile( ) function, the endpoint specified in the sendFile( ) call may be the same as the endpoint specified in the call to setPerf( ) or setSocketOption( ). The parameter fileDescriptor fp may be an identifier or handle for the data file 150. The parameter startOffset so may indicate a starting offset within the data file 150 identified by fileDescriptor fd. Blocks of data file 150 starting at startOffset so may be sent to client 125, while blocks located at smaller offsets within data file 150 may not be sent. The number of blocks to send, or the amount of data of data file 150 to be sent, may be specified by the parameter amountToSend ats. By adjusting startOffset so and/or amountToSend ats, application 120 may send any desired subset of the data file 150, instead of the whole file. That is, the depicted parameter set allows application 120 to send the entire data file 150 (e.g., by setting startOffset so to "0" and amountToSend ats to the size of the data file 150), or a specified portion of the data file 150, in a single invocation of the sendFile( ) function. In some implementations, a particular value of ats (such as "0" or "−1") may be used to indicate that the entire contents of the data file 150 are to be sent, instead of application 120 having to specify the exact length of the data file 150.

In one embodiment, the size of the individual packets or datagrams that may be used to send the data by operating system 130A may be specified by the parameter packetSize ps. The packetSize parameter may be omitted (or ignored by operating system 130A) in some embodiments where, for example, preferred packet size may be requested using a function similar to setSocketOption( ) or setPerf( ), as described above. In some embodiments, packetSize ps may indicate a desired or preferred packet size, and while operating system 130A may attempt to generate packets of a size equal to the preferred packet size, one or more packets sent by operating system 130A may differ in size from ps. Any desired units (such as bytes or disk blocks) may be used to specify startingOffset, amountToSend and packetSize. The parameter flags fg may be used to specify various desired characteristics of the data transmission, in a similar manner as flags parameters may be used in the functions such as setPerf( ) and setSocketOption( ) described earlier.

FIG. 5b illustrates one example of a set of parameters that may be used to send one or more data files 150 using a function named "sendFileArray( )" to invoke system call interface 210. In FIG. 5b, the parameters to sendFile( ) include endPoint ep, fileSpecArray fsa, arrayLength al, packetSize ps and flags fg. The parameters endPoint ep, packetSize ps and flags fg may be used for similar purposes as those described above for the corresponding parameters to sendFile( ). The parameter fileSpecArray fsa may include a collection of one or more file specification data structures 510, such as the array consisting of fileSpecArray[0], fileSpecArray[1], . . . fileSpecArray[n−1] illustrated in FIG. 5b. The number of elements within the collection fsa (e.g., "n" in the example shown in FIG. 5b) may be specified using the parameter arrayLength al. Each file specification data structure 510 may, in turn, include a file identifier for a particular data file 150 (such as fileDescriptor fd0 in fileSpecArray[0] fileDescriptor fd1 in fileSpecArray[1], etc.), a starting offset within the data file 150 at which data transmission is to begin (such as startingOffset sf0 in fileSpecArray[0], etc.), and an amount of data of the data file 150 that is to be sent to client 125 (such as amountToSend ats0 in fileSpecArray[0], etc.). Thus, the parameter fileSpecArray fas may be used to specify the same type of information for one or more data files 150 that was provided by the parameters fileDescriptor fd, startingOffset sfo and amountToSend ats for a single data file 150 in the case of the sendFile( ) function illustrated in FIG. 5a.

It is noted that the file descriptors of two or more file specification data structures 510 in fileSpecArray fsa may be identical, so that different fragments of a given data file 150 may be sent using a single invocation of sendFileArray( ). Alternatively, the same fragment or all of a given data file 150 may be sent repeatedly with a single invocation of sendFileArray( ). In some implementations, instead of providing a single parameter packetSize ps for all the data files 150 to be sent using an invocation of sendFileArray( ), the file specification data structures in fileSpecArray fsa may each include a field that may be used to specify the packet size separately for each file specification data structure 510. In addition, the flags fg parameter may also be used to specify desired relative sequencing of transmission of different data file portions or files specified in fileSpecArray fsa. For example, in one embodiment, application 120 may use the flags parameter to specify that the file fragments specified in fileSpecArray should be sent in array index sequence (i.e., the file fragment specified in fileSpecArray[0] should be sent before the file fragment specified in fileSpecArray[1], and the file fragment specified in fileSpecArray[0] should be sent before the file fragment specified in fileSpecArray[1], etc.). Another setting of the flags parameter may be used to specify that the different file fragments specified in fileSpecArray may be sent in any order, or that a specified subset of the file fragments should be sent earlier than the remaining file fragments, etc.

The ability to intersperse portions of multiple data files 150 with a single invocation of a system call interface such as sendFileArray( ) may be exploited by various applications 120 to perform a number of desired business functions. For example, a video service provider may wish to show short advertisements at intervals during the course of a motion picture or other video presentation. In such an environment, the video service provider application 120 may use alternate file specification data structures 510 to show segments of the video presentation, followed by advertisements. For example, fileSpecArray[0] may be used to transfer 15 minutes of the video presentation, fileSpecArray[1] may be used to transfer a 30-second advertisement, fileSpecArray[2] may be used to transfer the next 15 minutes of the video presentation, fileSpecArray[3] may be used for another 30-second advertisement, and so on. The segments of the video presentation corresponding to the 15-minute blocks may all be stored within a single large file, or in separate files. The advertisements may be selected dynamically (e.g., at the time that sendFileArray( ) is invoked) based on such factors as client profile information, time of day, geographical location of the client, etc. In some embodiments, a number of different advertisements may be transferred to client 125 using a single invocation of sendFileArray( ), and the client may be configured to display the advertisements in a desired sequence. In some embodiments, one or more data files 150 may be pre-formatted (e.g., by a pre-processing application or by application 120) for datagram-based transmission; for example, recommended datagram boundaries or record boundaries may be inserted in the data file to allow the application to send the contents of the data file in units expected or preferred by the client.

Figure 6:
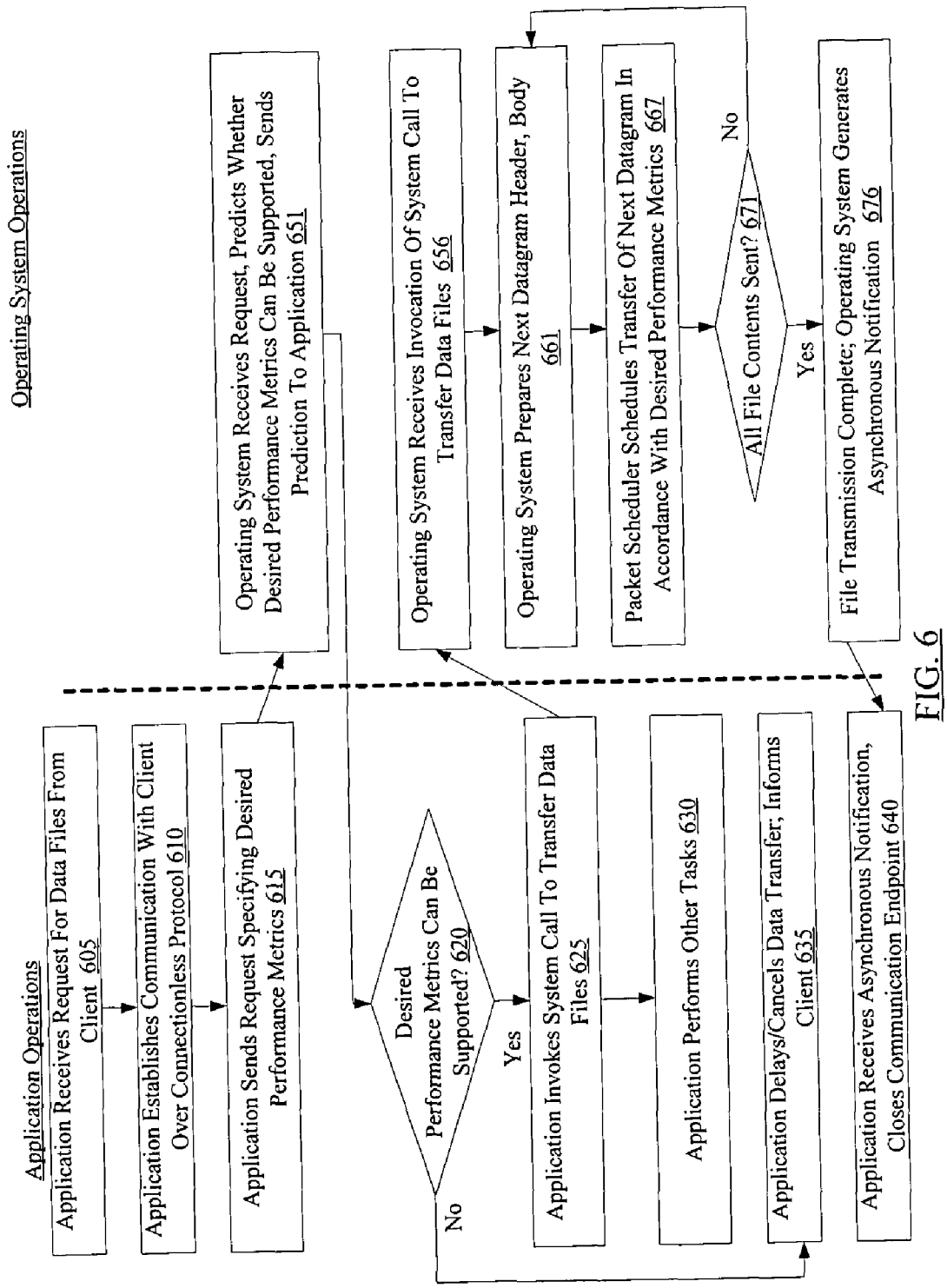
FIG. 6 is a flow diagram illustrating aspects of the operation of an application and an operating system in preparation for and during a transfer of one or more data files, according to one embodiment.

FIG. 6 is a flow diagram illustrating further aspects of the operation of application 120 and operating system 130A in preparation for and during a transfer of one or more data files 150, according to one embodiment. Application 120 may receive a data transfer request from a client 125, as indicated in block 605 of FIG. 6. The request may be received over any appropriate networking protocol, such as a connection-oriented protocol in some embodiments, and a connectionless protocol in other embodiments. In response to the client's request, application 120 may be configured to establish communication with the client 125 via a connectionless network protocol (block 610). As noted earlier, client 125. and application 120 may both need to cooperate in the establishment of communication, for example by participating in a multi-step handshake protocol, which may include a creation of a communication endpoint at both hosts 101A and 101B, and an association of network addresses with the endpoints.

Application 120 may then send a request to operating system 130A specifying one or more desired performance metrics for a data transfer corresponding to the client's request (block 615). The metrics may be derived in some embodiments from performance requirements provided by the client 125, as noted earlier. In response to the request from the application, operating system 130A may be configured to predict whether the desired performance metrics can be supported, and return a response indicating a prediction result to the application 120 (block 651). If the desired performance metrics can be supported (as detected in decision block 620), the application 120 may open one or more data files to be transferred to the client 125 and invoke the sendFile system call interface 210 or its logical equivalent (block 625) using a function similar to those illustrated in FIG. 5a and FIG. 5b. It is noted that application 120 is not required to read the contents of the data files 150, or copy contents of the data files to application address space (e.g., to a buffer allocated by application 120). Rather, application 120 may merely pass identifiers (such as file descriptors, handles, or file names) for data files 150 to the operating system when invoking system call interface 120. Identifiers for the communication endpoint created by the application 120, and other parameters similar to those described above may also be passed to the operating system 130A as parameters during the invocation.

Operating system 130A may receive the invocation of the system call interface to transfer the data files 150 (block 656 of FIG. 6), and perform various validation checks on the parameters passed during the invocation, as described earlier. Operating system 130A may then proceed to generate datagrams or messages to transfer the contents of the data files 150 to be sent to client 125. Each datagram may typically include a header containing control information and a body containing the data being transferred. As noted earlier, typically each datagram sent using a connectionless network protocol is treated independently from any other datagram, and may therefore include destination address information. The destination address information, as well as other metadata related to the contents of the datagram (such as the header length, the number of bytes of data being sent, and one or more checksum values generated from the datagram contents) may be included in the datagram header.

A given data file 150 (or a segment of a given data file 150 specified by a starting offset and a length during system call interface invocation) may be sent to client 125 using one or more datagrams. Operating system 130A may be configured to prepare the header and body for each datagram (block 661). The preparation may include a number of operations, for example, allocating memory for the header and the body, populating various fields of the header, reading contents of a data file 150 from a storage device 140A or from a kernel cache and copying the data to the memory allocated for the body. It is noted that the application 120 is not required to allocate memory for or generate the content of individual datagram headers, as in some traditional data transfers over connectionless protocols; instead, these tasks are handled by the operating system 130A. The packet scheduler 132 may then schedule the transfer of the datagram to the client in accordance with the desired performance metrics specified earlier by application 120 (block 667 of FIG. 6). In preparing a given datagram, in some implementations operating system 130A may make a best effort to set the datagram size to match a packetSize parameter passed during a call to sendFile, setPerf( ) or setSocketOption( ). However, the operating system may be configured to use a different datagram size if, for example, the different datagram size may help performance. After a particular datagram is sent, operating system 130A may check whether all the data file contents specified in the invocation of the system call interface 210 have been sent (decision block 671). If some data remains to be sent, the steps of preparing and scheduling datagrams (blocks 661 and 667) may be repeated by operating system 130A for the remaining data, until the requested data file transmission is complete (block 671). In one embodiment, operating system 130A may be configured to send an asynchronous notification (e.g., using an event notification framework or an asynchronous socket interface) to application 120 indicating that the data transfer has been completed (block 676).

The application 120 may proceed to perform other tasks (block 630) after the system call interface to initiate data transfer (e.g., the sendFile interface 210) has been successfully invoked. The other tasks could include a variety of operations in different embodiments. For example, in an embodiment where application 120 is an audio or video file server handling multiple clients 125, the other tasks may include preparation for (and invocation of system call interface 210 for) file transfer to a different client, or operations such as billing, report generation, inventory, etc. Thus, by invoking a single system call interface such as sendFile, application 120 may transfer responsibilities for the details of file transmission (e.g., generating/preparing the headers and bodies of the datagrams, and sending the datagrams) for one or more data files 150 or data file segments to the operating system 130A, and may be free to perform other needed functions at the application level while the data transfer is handled by the operating system. Operating system 130A may be aware of low-level details such as networking hardware or software performance characteristics (e.g., optimum packet sizes), which may not be known to application 120. This may allow operating system 130A to optimize the data transfer more effectively than may have been possible if application 120 were to perform data transfers at the datagram level. In addition, operating system 130A may be able to make use of a kernel cache to further improve data file transfer performance. On receiving an asynchronous notification indicating from operating system indicating that a requested data transfer has completed (block 640), application 120 may be configured to close a communication endpoint such as a socket that was in use during the data transfer. If operating system 130A informs the application 120 that one or more desired performance metrics cannot be supported (as detected in decision block 620 of FIG. 6), application 120 may delay or cancel the data transfer and/or inform the client that the data transfer cannot be initiated at the current time (block 635).

Figure 7:
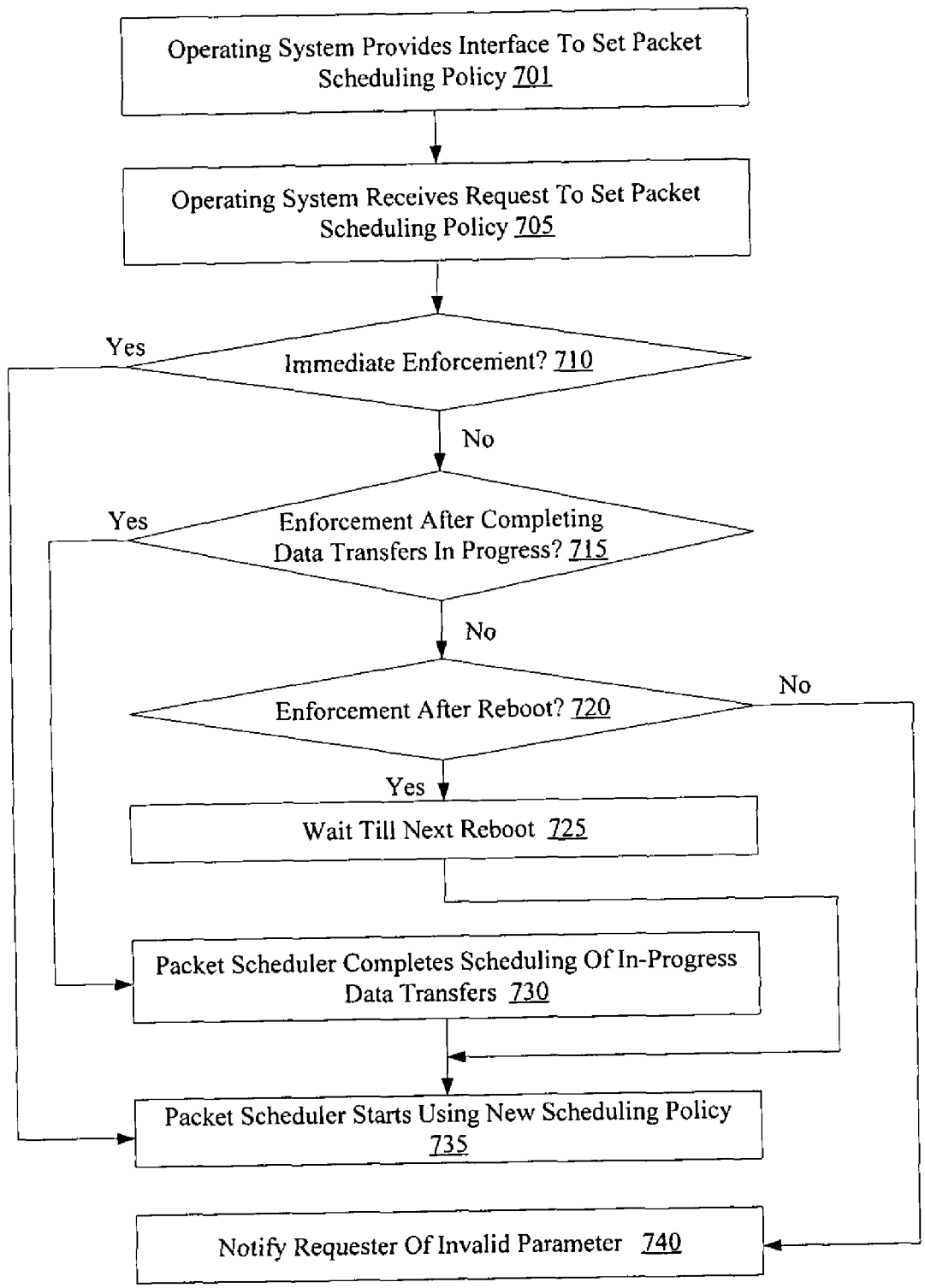
FIG. 7 is a flow diagram illustrating aspects of the operation of an operating system in an embodiment where a configurable scheduling policy may be implemented at a packet scheduler.

As noted earlier, in some embodiments, packet scheduler 132 may be configured to schedule packets for transmissions over the connectionless networking protocol in accordance with a configurable scheduling policy. FIG. 7 is a flow diagram illustrating aspects of the operation of operating system 130A in an embodiment where such a configurable scheduling policy may be implemented at packet scheduler 132. In one embodiment, operating system 130A may include a specific system call interface (such as setSchedPolicy interface 215) for setting the scheduling policy. FIG. 8 illustrates one example of a set of parameters that may be used to set a configurable scheduling policy using a function named "setSchedPolicy( )" to invoke system call interface 215.

As shown in block 701 of FIG. 7, operating system 130A may provide an interface to set the configurable packet scheduling policy for packet scheduler 132 in the depicted embodiment. As illustrated in FIG. 2 and FIG. 8, in some embodiments the interface may comprise a system call interface, such as the setSchedPerf interface 215. In other embodiments, the interface may comprise one or more parameters in one or more configuration files, a settable environment variable, or some other mechanism. The interface may allow a specification of a particular scheduling policy (e.g., using the policyName parameter of the setSchedPolicy( ) function shown in FIG. 8), as well as a specification of when the scheduling policy should take effect (e.g., using the whenToEnforce parameter of setSchedPolicy( )).

A number of different packet scheduling policies may be specified in different embodiments. For example, in one embodiment, one scheduling policy may differ from another in the set of resources to be considered when making a scheduling decision or a prediction as to whether a desired set of performance metrics can be supported. One scheduling policy may be limited to considering network bandwidth limits, while another policy may use utilization information for additional resources such as processors, storage devices, etc. Another scheduling policy may be configured to send one or probes or messages to client 125 or to other nodes in the network, receive acknowledgements for the probes indicating the time it took to deliver the probes, and use such information in making scheduling decisions. Scheduling policies may also differ in the manner in which the data transfer workload corresponding to different clients of an application 120, or to clients of different applications 120, is handled by packet scheduler 132. For example, in one scheduling policy, relative priorities may be assigned to different applications 120 or to different data transfers, while in other policies, all data transfers may be considered to have the same priority. The packet scheduler 132 may, for example, use a single global timer set to indicate when the next datagram is to be issued in an embodiment where all data transfers have equal priority, and may have separate timers for different priority levels and/or different applications 120 in other embodiments. In addition to parameters specifying the scheduling policy to be set, and an indication of when it should take effect, the setSchedPerf( ) function may also include a flags parameter providing generally similar functionality (e.g., extensibility) to that provided by flags parameters to functions such as setPerf( ), sendFile( ), etc., as described earlier.

A system administrator or other user may use the interface provided by operating system 130A to set or change the scheduling policy, for example using a command-line interface or a graphical user interface (GUI). In some embodiments, an application such as application 120 may invoke the interface using a function such as setSchedPolicy( ) of FIG. 8. On receiving a request to set or change the scheduling policy (block 705 of FIG. 7), operating system 130A may be configured to respond in different ways depending on when the specified policy is to take effect. If the policy change is to take effect immediately (as detected in decision block 710), packet scheduler 132 may be configured to start using the new policy immediately (block 735). In some embodiments, it may be possible to specify (e.g., using the whenToEnforce parameter of setSchedPolicy( )) that the specified policy change should be made effective only after the current set of in-progress data transfers is complete, or after a next reboot of host 101A. If the policy change is to occur after current data transfers are complete (as detected in decision block 715), packet scheduler 132 may be configured to complete the scheduling of datagrams for in-progress data transfers (block 730) before changing the policy. If the policy change is to take effect only upon a next reboot (as detected in decision block 720), packet scheduler may continue using the currently in-place scheduling policy until the next reboot occurs, i.e., to wait till the next reboot (block 725) before enforcing the new policy. In some embodiments, if a parameter specifying when the policy change is to occur is invalid, operating system 130A may return an error message to the requester (such as application 120 or a system administrator) indicating the invalidity (block 740).

It is noted that one or more of the parameters described above for setPerf( ), setSocketOption( ), sendFile( ), sendFileArray( ), setSchedPolicy( ) or their equivalents, may be omitted in various embodiments, and that other parameters not shown in FIG. 4a-4b, FIG. 5a-5b and FIG. 8 may be used instead of, or in addition to, the parameters described above. For example, the arrayLength parameter to sendFileArray( ) may be omitted in some embodiments. In one embodiment, instead of providing a file descriptor identifying an already open data file 150 as a parameter to sendFile( ) or sendFileArray( ), in some implementations a file name may be provided as a parameter, and operating system 130A may open the file. In some implementations, operating system 130A may be configured to use default values for one or more parameters if the parameter values are not specified by the caller.

The function or functions used to invoke various system call interfaces described above may each provide a return value to the caller, such as application 120, in some embodiments. The return value may include an indication of an absence of an error or a detection of an error. For example, in one implementation, operating system 130A may be configured to perform validation checks on one or more of the parameters passed to the function. If the parameters passed to the function are not valid (e.g., if there is a type mismatch between the actual parameter and the expected parameter, or if a given parameter does not lie within an expected range of values), an error code identifying the specific type of invalidation detected may be returned. Error codes may also be returned, if, for example, operating system 130A detects that a needed resource (e.g., memory) required is exhausted.

FIG. 9 is a block diagram illustrating constituent elements of a host 101A, according to one embodiment. As shown, host 101A may comprise one or more processors such as processors 105A and 105B coupled to one or more memories such as memory 110. Processors 105A and 105B may be implemented using any desired architecture or chip set, such as the SPARC™ architecture from Sun Microsystems or the x86-compatible architectures from Intel Corporation, Advanced Micro Devices, etc Program instructions that may be executable to implement the functionality of application 120 and/or operating system 130A may be partly or fully resident within a memory 110 at a given point in time. Memory 110 may be implemented using any appropriate computer readable medium such as any of various types of RAM (e.g., DRAM, SDRAM, RDRAM, SRAM, etc.). Host 101A may also include one or more I/O interfaces 112 providing access to storage devices 140A, and one or more network interfaces 114 providing access to network 160. In addition to data files 150, part or all of the program instructions that may be executable to implement the functionality of operating system 130A and/or application 120 may also be stored within storage devices 140A.

Storage devices 140A and 140B may include any desired type of persistent and/or volatile storage devices or computer readable medium, such as individual disks, disk arrays, optical devices such as CD-ROMs, CD-RW drives, DVD-ROMs, DVD-RW drives, flash memory devices, various types of RAM and the like. In some embodiments where, or example, application 120 is a multimedia server, storage devices 140A may include one or more jukebox devices providing access to a library or collection of video and/or audio files. One or more storage devices 140A and 140B may be directly coupled to their respective hosts 101A and 101B in some embodiments (e.g., using the Small Computer Systems Interface (SCSI) protocol), or may be accessible over any desired storage interconnect such as a fiber channel fabric or storage area network (SAN) in other embodiments.

The sizes and formats of data files 150 may vary in different embodiments. For example, in some embodiments, data files 150 may be video, audio, or image files that may each be formatted according to a standard such as a version of the Moving Pictures Expert Group (MPEG) family of standards such as MPEG 2-Layer 3 (MP3), a version of the Joint Photographic Experts Group (JPEG) standard, or any other appropriate standard or format. Data files 150 may be stored and/or transmitted in compressed or uncompressed format in different embodiments. In one embodiment, for example, a data file 150 may be stored in uncompressed format on a storage device 140A, but may be compressed (e.g., by operating system 130A or by application 120) prior to transmission over network 160. As noted earlier, in some embodiments one or more data files 150 may be pre-formatted for datagram-based transmission; for example, a data file 150 may be logically divided (for example, by a preprocessing application or by application 120 in a preprocessing step prior to sending the data file) into segments, where each segment may be sent in a single datagram. Record boundaries or datagram boundaries may be inserted into the data files during the pre-formatting. In one embodiment, a data file 150 may also contain application metadata, such as frame sequence numbers in the case of a video data file that may be interpreted and used by client 125 in an application-specific manner. The metadata may be inserted at appropriate offsets within the data file 150 by application 150 or by another application at host 101A prior to transmission of the file.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system, comprising:
a server for a plurality of data files, wherein the server is configured to receive requests from remote clients via a connection-oriented protocol, wherein each request identifies one or more data files requested by one of the remote clients and one or more desired performance metrics for transmitting the requested one or more data files to the remote client over a network, the server comprising:
a processor; and
a memory coupled to the processor and storing program instructions executable by the processor to implement:
an operating system comprising a packet scheduler for scheduling data transmissions via a connectionless network protocol; and
an application configured to:
receive the requests from the remote clients; and
for each request, indicate to the operating system, via a system call interface of the operating system, that the operating system should transmit the one or more data files identified by the request, according to one or more performance metrics including the one or more desired performance metrics identified by the request and via the connectionless network protocol, to a corresponding one of the remote clients;
wherein, in response to each indication from the application specifying one or more desired performance metrics for a data transfer of one or more of the data files via the connectionless network protocol over the network to the corresponding remote client, the packet scheduler in the operating system is configured to schedule the data transfer in accordance with the one or more desired performance metrics, wherein application of the one or more desired performance metrics to the data transfer is handled by the operating system's packet scheduler instead of by the application that received the request, and wherein one of the performance metrics specified by the application includes a maximum tolerable jitter;
wherein the operating system is configured to transfer the one or more data files to the remote client via the connectionless protocol without the application copying contents of the one or more data files to an address space of the application.

2. The system as recited in claim 1, wherein, in response to the indication from the application, the operating system is configured to:
predict whether the one or more desired performance metrics can be supported; and
send a response to the application indicating a prediction result.

3. The system as recited in claim 1, wherein, in response to an invocation of the system call interface, the operating system is configured to:
predict whether the one or more desired performance metrics can be supported;
if a result of the prediction indicates that the one or more desired performance metrics can be supported, send the one or more data files to the another system via the connectionless networking protocol without the application copying contents of the one or more data files to an address space of the application; and
if a result of the prediction indicates that a desired performance metric of the one or more desired performance metrics cannot be supported, send a response to the application indicating that the desired performance metric cannot be supported.

4. The system as recited in claim 1, wherein the operating system includes a system call interface for specifying the one or more desired performance metrics, and wherein the application is configured to invoke the system call interface to specify the one or more desired performance metrics.

5. The system as recited in claim 1, wherein the one or more desired performance metrics includes at least one of: a preferred transfer rate, the maximum tolerable jitter, or a desired packet size.

6. The system as recited in claim 1, wherein the packet scheduler is configured to schedule the data transmissions in accordance with a configurable scheduling policy.

7. The system as recited in claim 6, wherein the operating system includes a system call interface for specifying the configurable scheduling policy.

8. The system as recited in claim 1, wherein the connectionless networking protocol is the User Datagram Protocol (UDP).

9. A method, comprising:
an operating system for a server comprising a processor, the operating system providing an interface for specifying one or more desired performance metrics for a data transfer of one or more data files, wherein the data transfer is via a connectionless network protocol;
the operating system receiving a request from an application on the server, via a system call interface of the operating system, to perform a data transfer of the one or more data files to a remote client according to one or more desired performance metrics specified by the client,
wherein the application sends the request to the operating system in response to a request received by the application from the remote client via a connection-oriented protocol to transmit the data files to the remote client over a network, wherein the request from the remote client identifies one or more performance metrics including the one or more desired performance metrics specified by the client, and wherein the one or more performance metrics identified in the request include a maximum tolerable jitter; and
in response to the request from the application, a packet scheduler within the operating system scheduling the data transfer of one or more of the data files via the connectionless network protocol over the network to the remote client in accordance with the one or more performance metrics identified in the request, wherein application of the one or more performance metrics identified in the request to the data transfer is handled by the packet scheduler instead of by the application, and wherein the transfer is performed without the application copying contents of the one or more data files to an address space of the application.

10. The method as recited in claim 9, further comprising:
upon receiving the request,
the operating system predicting whether the one or more desired performance metrics can be supported; and
the operating system sending a response to the application indicating a result of the prediction.

11. The method as recited in claim 9, wherein
the system call interface includes an interface to initiate the data transfer and an interface to specify the one or more performance metrics.

12. The method as recited in claim 9, further comprising:
the packet scheduler scheduling the data transmissions in accordance with a configurable scheduling policy.

13. A computer readable medium comprising program instructions, wherein the instructions are executable to implement an operating system configured to:
provide a system call interface for specifying one or more performance metrics for a data transfer of one or more data files, wherein the data transfer is via a connectionless network protocol;
receive a request from an application via the system call interface, the request specifying one or more performance metrics and one or more data files for the data transfer, wherein the application is configured to send the request in response to receiving a request from a remote client via a connection-oriented protocol to transmit the one or more data files to the remote client over a network, wherein the request from the remote client identifies one or more desired performance metrics, wherein the one or more performance metrics specified in the request from the application include the one or more desired performance metrics identified in the request from the remote client, wherein the one or more performance metrics specified in the request from the application include a maximum tolerable jitter; and
in response to the request, schedule the data transfer at a packet scheduler within the operating system in accordance with the one or more desired performance metrics, wherein application of the one or more desired performance metrics to the data transfer is handled by the packet scheduler instead of by the application, and wherein the data transfer is performed without the application copying contents of the one or more data files to an address space of the application.

14. The computer readable medium as recited in claim 13, wherein the operating system is further configured to:
upon receiving the request,
predict whether the desired performance metrics can be supported; and
send a response to the application indicating a result of the prediction.

15. The computer readable medium as recited in claim 13, wherein
the system call interface includes an interface to initiate the data transfer and an interface to specify the one or more performance metrics.

16. The computer readable medium as recited in claim 13, wherein the packet scheduler is configured to schedule the data transmissions in accordance with a configurable scheduling policy.

* * * * *